No. 11,775. Reissued Sept. 26, 1899.

A. G. PACE.

COMBUSTION ENGINE.

(Application filed May 23, 1898.)

5 Sheets—Sheet 1.

Witnesses:
R. W. Pittman
Fred. J. Dole.

Inventor:
Augustus G. Pace.
By his Attorney
F. H. Richards.

No. 11,775. Reissued Sept. 26, 1899.

A. G. PACE.

COMBUSTION ENGINE.

(Application filed May 23, 1898.)

5 Sheets—Sheet 2.

Witnesses.
R. W. Pittman
Fred. J. Dole.

Inventor
Augustus G. Pace
By his Attorney
F. H. Richards.

No. 11,775. Reissued Sept. 26, 1899.
A. G. PACE.
COMBUSTION ENGINE.
(Application filed May 23, 1898.)
5 Sheets—Sheet 3.
Fig. 5.
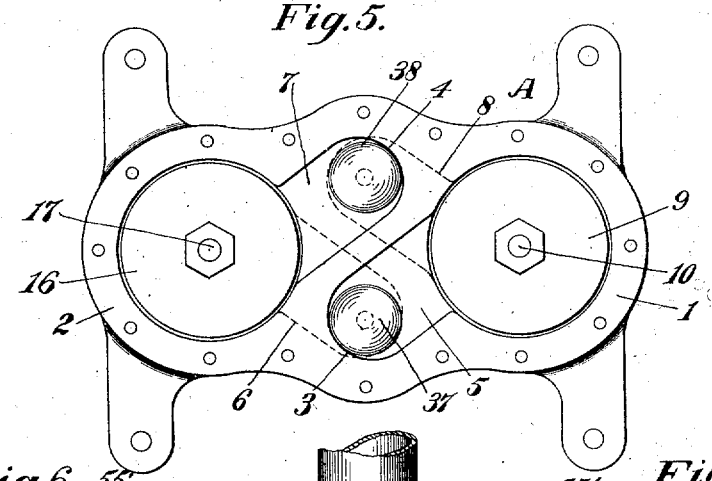
Fig. 6.
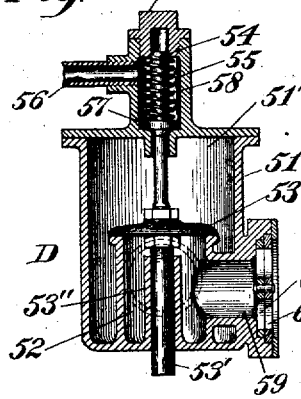
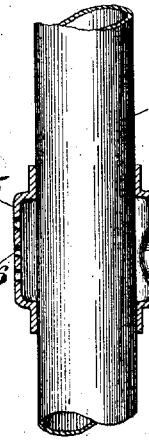
Fig. 7.
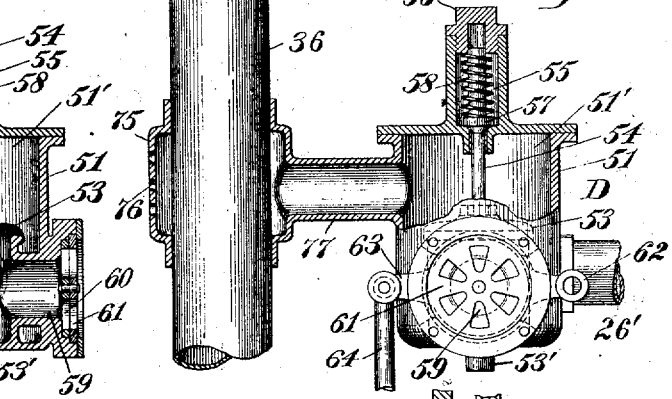
Fig. 9.
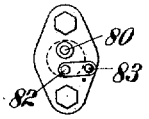
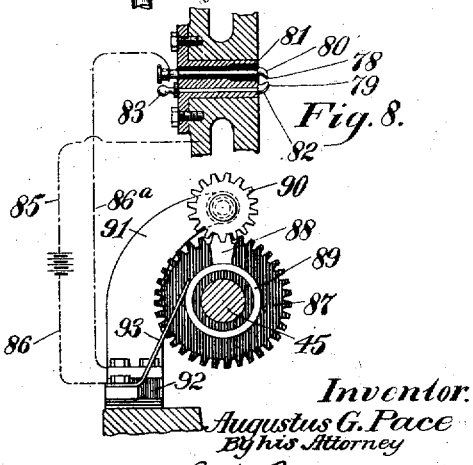
Fig. 8.
Witnesses.
C. W. Pittman
Fred. J. Dole.
Inventor.
Augustus G. Pace
By his Attorney
F. H. Richards.

No. 11,775. Reissued Sept. 26, 1899.
A. G. PACE.
COMBUSTION ENGINE.
(Application filed May 23, 1898.)
5 Sheets—Sheet 4.
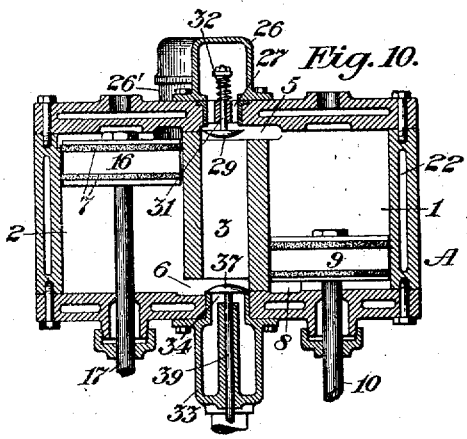
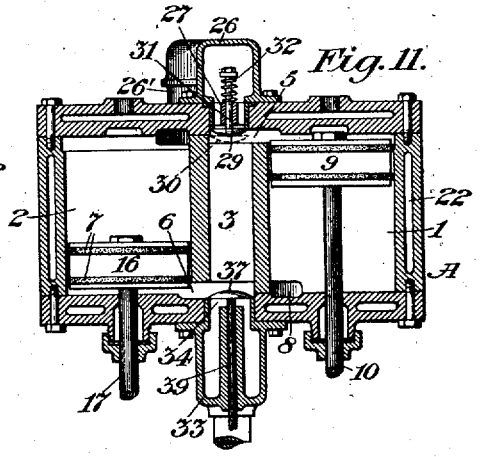
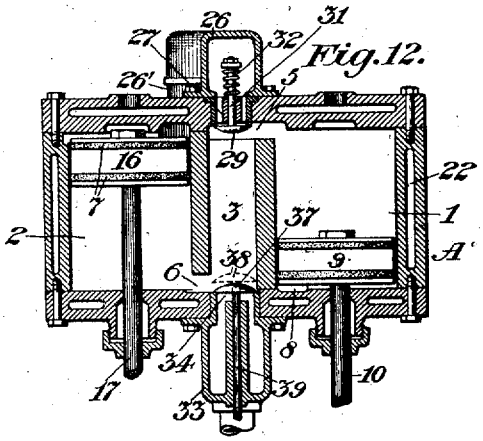
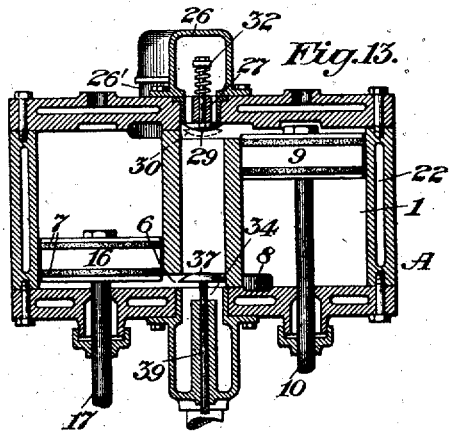
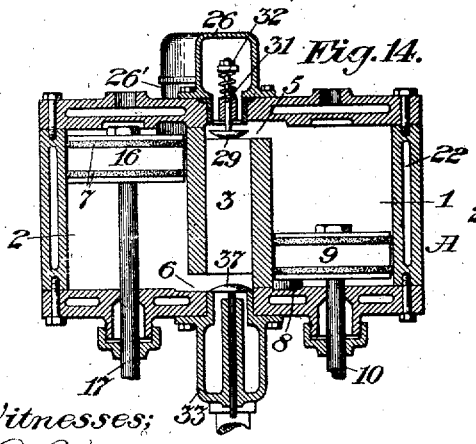
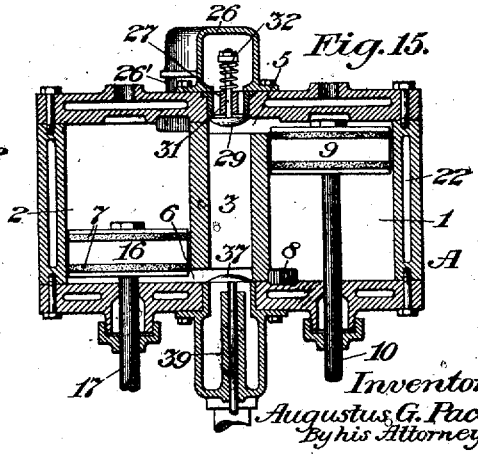
Witnesses;
A. B. Mattingly
Fred. J. Dole.
Inventor:
Augustus G. Pace
By his Attorney
F. H. Richards.

No. 11,775. Reissued Sept. 26, 1899.

A. G. PACE.

COMBUSTION ENGINE.

(Application filed May 23, 1898.)

5 Sheets—Sheet 5.

Witnesses;
R. W. Pittman
Fred. J. Dole.

Inventor
Augustus G. Pace
By his Attorney
F. H. Richards.

BEST AVAILABLE COPY

UNITED STATES PATENT OFFICE.

AUGUSTUS G. PACE, OF NEW YORK, N. Y.

COMBUSTION-ENGINE.

SPECIFICATION forming part of Reissued Letters Patent No. 11,775, dated September 26, 1899.

Original No. 588,466, dated August 17, 1897. Application for reissue filed May 23, 1898. Serial No. 681,506.

*To all whom it may concern:*

Be it known that I, AUGUSTUS G. PACE, of New York city, in the county and State of New York, have invented a new and Improved Combustion-Engine, of which the following is a full, clear, and exact description.

This invention relates to engines, and more particularly to that class thereof in which a combustible material or fluid is ignited to permit the expansive force thereof to operate a piston and which are generally designated as "gas-engines."

The object of the invention is to provide a double-acting engine of this character in which a plurality of pistons are simultaneously acted upon in such manner that the force exerted by the combustible material on one side of one piston is equal to the force exerted on the other side of another piston, thereby to produce a relatively perfectly-balanced engine in which the ordinary shocks which take place in gas-engines are avoided or reduced to a minimum.

A further object of the invention is to provide a gas-engine effective in operation and which as compared with analogous devices of this character developing the same amount of power will be simple in construction and of materially less weight and bulk.

Figure 1:
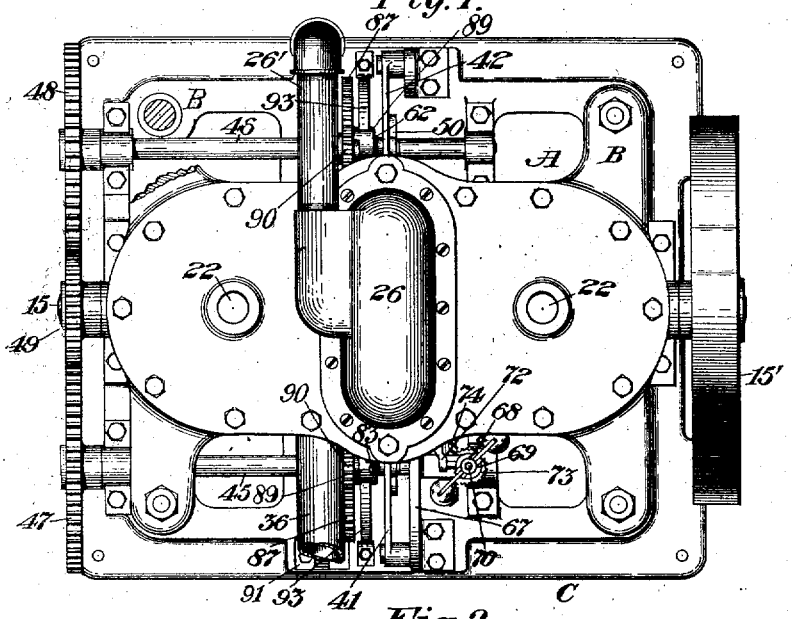
Figure 2:
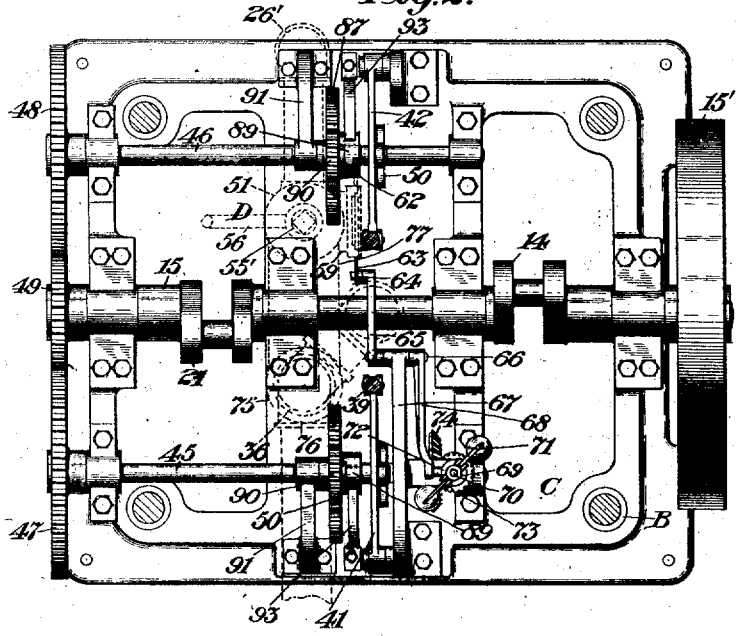
Figure 4:
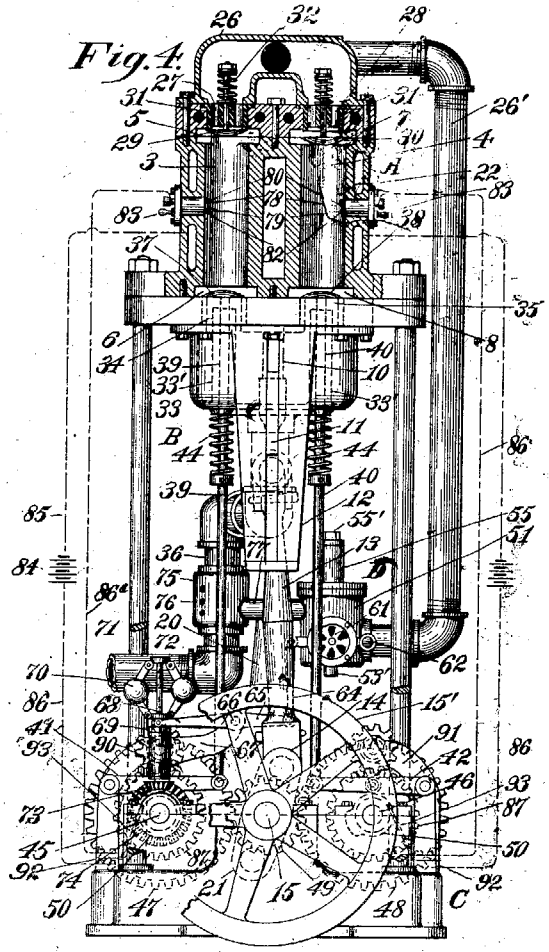
Figure 3:
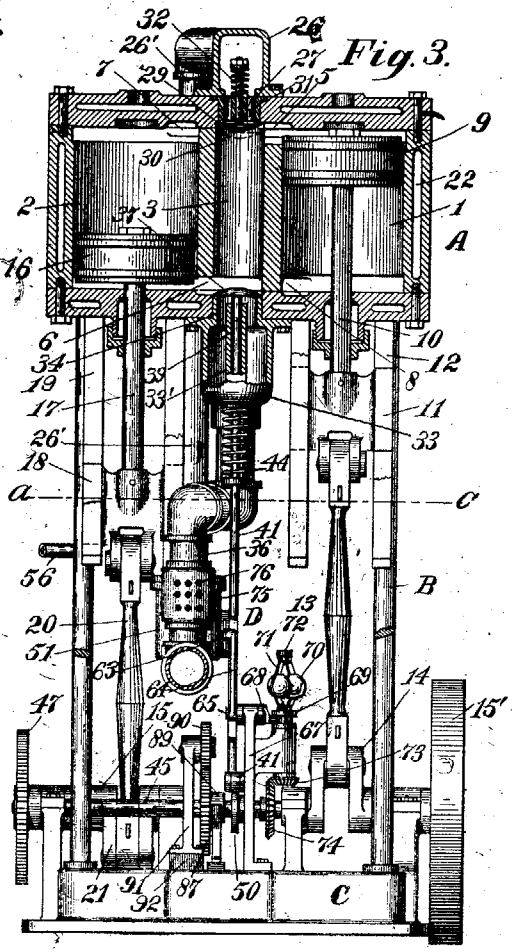
Figure 16:
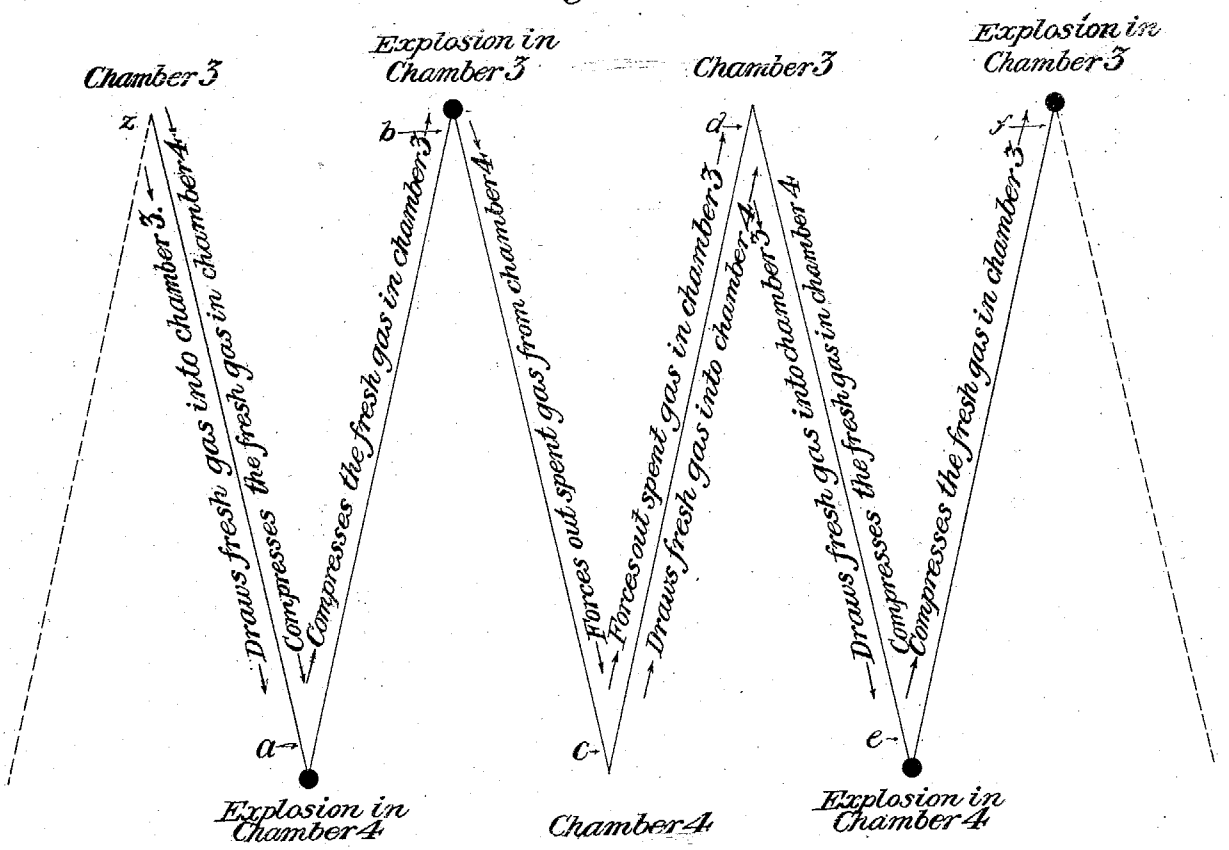

In the drawings accompanying and forming part of this specification, Figure 1 is a top view of one form of engine embodying this invention. Fig. 2 is a transverse sectional view thereof, taken in line *a a*, Fig. 3. Fig. 3 is a view of this form of engine, partly in vertical section. Fig. 4 is a like view, but taken at right angles to that shown in Fig. 3. Fig. 5 is a plan view of one organization of piston-cylinders and combustion-chambers, the end or top plate of the casing being removed. Fig. 6 is a vertical sectional view of one form of a combustible fluid or material supply device—such, for instance, as a carbureter. Fig. 7 is a side view thereof, looking toward the left hand and partly in section, said device being shown connected with the exhaust-conduit. Fig. 8 is a detail view, on an enlarged scale, showing one form of igniting mechanism which may be used in connection with this improved engine. Fig. 9 is a detail view of one form of device for separating the sparking points of said igniting mechanism. Figs. 10 to 15, inclusive, are vertical sectional views of the present organization of piston-cylinders and combustion-chambers for the purpose of illustrating the operation of the engine; and Fig. 16 is a diagrammatic view, on an enlarged scale, illustrating the work performed by the pistons during each stroke thereof.

Similar characters of reference designate corresponding parts in the different figures of the drawings.

As a preface to a further description of this improved engine, it will be understood that while the same is shown in the drawings as an "upright" engine and described herein as having an explosive force effective at the under side of one piston and the upper side of the other piston, it will nevertheless be understood that such engine may be disposed in a horizontal or in any other desired position, so that the terms "under" and "upper" or their equivalent expressions as used herein are to be interpreted to mean in the description and claims as one or the other side of the pistons, as the case may be.

I furthermore desire to state that the organization herein shown and described may be more or less varied without departing from the scope of the invention, which comprises in a general way a plurality of pistons so organized that the force which operates at one side of one of the pistons simultaneously operates at the other side of another piston and may also operate first at one side of the pistons and then at the opposite sides thereof, so that said pistons are simultaneously operative in opposite directions, each under a force equal to a force exerted on its companion piston, and that whatever organization accomplishes this result is within the scope of this invention.

This improved gas-engine comprises in one form thereof herein shown and described and which may be its preferred form, if desired, a plurality of piston-cylinders, each having a piston therein and a plurality of combustion-chambers, each combustion-chamber of the series being in communication with both piston-cylinders, whereby on an explosion in each combustion-chamber the explosive gases will pass simultaneously into each of said cylinders, said combustion-cham-

BEST AVAILABLE COPY bers having induction and eduction passages or ports to permit the inflow and outflow, respectively, of fresh and spent combustible material, the induction and exhaust thereof being effected in the present instance by means of the pistons, the induction preferably by the suction created by such pistons and the exhaust preferably from a rotary part of the engine put in operation by said pistons, and said combustion-chambers having connected therewith suitable means for supplying combustible material and with suitable means for igniting the same.

In the present organization of engine it comprises a pair of piston-cylinders 1 and 2, shown herein forming a casing, (designated in a general way by A.) This cylinder-forming casing may be supported in any desired and suitable way; but in the present instance it is shown supported by and bolted to a series of uprights B, carried by a base C and which may form the framing of the engine. In communication with these piston-cylinders 1 and 2 is an expansive-force-generating compartment, which may comprise a pair of combustion-chambers 3 and 4. In the present organization of engine shown herein these chambers are disposed in the casing forming the piston-cylinders and are shown herein as disposed intermediate said cylinders, one or the upper end of the combustion-chamger 3 being in communication with one cylinder, as the cylinder 1 adjacent to one or the upper end thereof, by means of a suitable port or passage 5 of suitable area, while the opposite or lower end of said chamber 3 is in communication with the other cylinder 2, adjacent to one or the lower end thereof, by a like port or passage 6, while one or the upper end of the other combustion-chamber 4 is in communication with the cylinder 2, adjacent to one or the upper end thereof, by a similar port or passage 7, while its opposite or lower end is in communication with the cylinder 1, adjacent to one or at the lower end thereof, by a like port or passage 8, from which it will be seen that each combustion-chamber is in communication with a pair of piston-cylinders, being in communication adjacent to one end with the cylinder at one side thereof and in communication adjacent to the other end with the cylinder at the other side thereof, and that the combustion-chamber which communicates with one cylinder adjacent to the top thereof also communicates with the other cylinder adjacent to the bottom thereof, so that when an explosion takes place in either combustion-chamber expansive gases simultaneously pass to each piston-cylinder, at the top of one and at the bottom of the other, whereby an equal force is exerted on each piston, thereby to operate the same simultaneously in opposite directions. By this organization it will be seen that a double-acting engine is provided in which the pistons are acted on first at one side and then at the opposite side thereof.

Disposed in the cylinder 1 is a piston 9 and in the cylinder 2 is a piston 16, each of which may be provided with suitable packing in the usual manner, the rods 10 and 17 of said pistons being shown in the present instance extending downward and passing through the cylinder-walls and preferably through suitable stuffing-boxes and respectively connected with slide-blocks 11 and 18, movable vertically in guideways 12 and 19, depending from the casing. These slide-blocks 11 and 18 are respectively connected by pitmen 13 and 20 with a driving crank-shaft 15, the cranks 14 and 21 of which are extended in opposite directions, whereby when one piston is adjacent to one end of one cylinder the other piston is adjacent to the opposite end of the other cylinder—that is to say, when one piston is adjacent to the bottom of its cylinder its companion piston is adjacent to the top of its cylinder, it being understood that the explosions may either occur when the cranks are substantially at their dead-centers and the pistons are correspondingly at the extreme limit of their strokes, the momentum of the fly-wheel being sufficient to carry such pistons by their dead-centers, whereby an entire stroke of the pistons receives the full benefit of the explosion, or such explosions may occur at that time when the cranks are slightly off their dead-centers and the pistons have commenced their downward stroke. The crank-shaft 15 is provided with the usual fly-wheel 15′, the momentum of which, due to the explosions in the combustion-chambers, will during a predetermined period after such explosions reciprocate the pistons, thereby to place the engine in condition for the next explosions.

All the walls of the casing may, if desired, be provided with waterways 22 to allow for a circulation of cold water to reduce the temperature caused by the explosion of gas in the combustion-chambers.

Suitable means is provided for controlling the supply of combustible material to the combustion-chambers 3 and 4, and in the present instance this means comprises a pair of valves, designated herein as "inlet-valves," disposed one to control the passage of material to each combustion-chamber, and for this purpose the present organization of engine is shown provided with a housing 26, disposed at the top of the casing A and which housing has a port-communication 27 with the interior of the combustion-chamber 3 and a port-communication 28 with the interior of the combustion-chamber 4. These respective ports are controlled by inwardly-opening valves 29 and 30, each of which is shown having a stem extending upwardly through a suitable spider 31, disposed in the ports, and between which spiders and collars on the upper ends of the valve-stems coil-springs 32 are disposed. These springs tend to hold the valves yieldingly against their valve-seats, whereby the valves may be opened by suction at pre-

BEST AVAILABLE COPY determined periods in the operation of the pistons. This housing 26, and thereby the inlet-ports 27 and 28, is in communication, by means of a suitable conduit or pipe 26′, with a suitable combustible-material-supply device or apparatus, shown in the present instance as a carbureter, (designated in a general way by D,) comprising a casing 51, mounted on the frame of the engine at any suitable place and having a carbureting-chamber 51′ and an oil-receiving chamber 55, said carbureting-chamber having therein an auxiliary or air chamber 52, the upper end of the wall of which is formed as a valve-seat, supporting a puppet-valve 53, having a depending stem 53′ movable in and guided by a socketed member 53″, carried by the casing 51 and having an upwardly-extending stem 54 projecting through the upper wall of the casing 51 into said oil-receiving chamber 55, with which an oil-supply pipe 56 communicates. The opening through the upper wall of the casing 51 is shown somewhat larger than the diameter of the valve-stem 54, passing through it, so that an inlet for oil is formed between the wall of said opening and said stem. This oil or inlet opening is controlled by a valve 57, mounted on the stem 54 of said puppet-valve within the oil-receiving chamber 55. A coiled spring 58 surrounds an upwardly-extending arm of this oil-controlling valve 57, being disposed between said valve and the inner end of a removable closure 55′ of the oil-receiving chamber, and serves to hold both of said valves 53 and 57 in engagement with their respective valve-seats. The auxiliary or air chamber 52 has an inlet-pipe 59 for the admission of air, which is regulated by suitable means adapted for that purpose, and in the present instance this admission of air is controlled both manually and automatically. In the present structure the means for regulating the admission of air is shown comprising a pair of perforated disks 60 and 61, mounted for rotation adjacent to the outer end of the inlet-pipe 59. These disks are pivotally connected together at their centers, so that each may rotate independently of the other. From one disk (shown herein as the inner disk 60) a handpiece or handle 62 projects outwardly, whereby the disk may be rotated by hand to cause its perforations or openings to more or less register with the perforations or openings of the other or outer disk 61. This outer disk 61 has an outwardly-extending arm 63, to which a connector or link 64 is secured, the opposite end of which has a pivotal connection with an arm 65, mounted adjacent to one end of a rock-shaft 66, suitably supported by a bracket 67, secured to the framing of the engine. Adjacent to the opposite end of this rock-shaft 66 a second arm 68 is mounted and extends in a direction opposite to the arm 65. The free end of this arm engages an annular channel formed in a block 69, mounted to slide vertically on a centrifugal governor-shaft 70. In the present organization the governor comprises a plurality of weighted links 71, having their upper sections pivotally connected to a collar 72, rigidly secured to the governor-shaft, the lower sections being pivoted to the sliding block 69. The governor-shaft is supported by a suitable bearing and carries adjacent to its lower end a bevel-pinion 73 in mesh with a bevel-gear 74, mounted on one of the crank-shafts as, 45, hereinafter described. By this construction it will be seen that as the speed of the engine increases the governor-balls carried by the links will be forced outward by centrifugal action, and this motion will of course more or less rotate the disk 61 to regulate the openings for the admission of air.

It is desirable that a small amount of heated air shall be drawn into the carbureter-chamber 51′ to mix with the fresh air and oil to form combustible gas. For this purpose a jacket 75 is shown mounted on the exhaust-pipe 36, hereinafter described, and which jacket is provided at one side thereof with a series of openings or perforations 76 and is connected by a conduit or pipe 77 with the interior of said carbureting-chamber 51′. Since it is desirable that the amount of heated air admitted to the carbureting-chamber 51′ shall be quite small as compared with the air admitted through the openings in the disks 60 and 61, the combined area of the perforations 76 is consequently somewhat smaller than the combined area of the openings through said disks.

From the foreging it will be seen that when the inlet-valves 29 and 30 are opened by the suction of the pistons at the proper predetermined periods this same suction will operate through the conduit 26′, opening into the carbureter-chamber 51′, to open the oil-valve 57 and fresh-air valve 53, said air-valve being shown herein of greater area than said oil-valve, whereupon fresh air will pass from the auxiliary or air chamber 52 into the carbureter-chamber 51′ and there mingle with the heated air passing through the conduit 77 and with the oil from the oil-receiving chamber 55, this combined fluid being then drawn by such suction through said conduit 26′, leading from the carbureting-chamber 51′ to the housing 26 and from thence through that inlet-port the valve of which is open to the proper combustion-chamber.

It will be understood that other means for supplying the combustion-chambers with combustible material may be employed without departing from the scope of this invention.

After an explosion in each of the combustion-chambers 3 and 4 it is necessary to exhaust the spent gases resulting from such explosion; and for this purpose suitable means is provided, shown herein comprising a pair of exhaust-valves, one for each combustion-chamber, and shown operative by the engine, preferably through rotary parts thereof and through the instrumentality of the pistons,

BEST AVAILABLE COPY and in the present instance a housing 33 is shown secured in position at that end of the casing A opposite to that which carries the inlet-valve housing 26 and shown herein at the under side of said casing, and which housing communicates with said combustion-chambers 3 and 4 by means of suitable exhaust-ports 34 and 35, respectively, one for each chamber, and is provided with an exhaust-pipe 36, leading to any suitable place, and on which exhaust-pipe the perforated jacket 75 hereinbefore described is mounted. Disposed in position to control the exhaust-ports 34 and 35 are the exhaust-valves 37 and 38, one for each port, and which are provided with depending stems 39 and 40, projecting through suitable tubular portions 33' within the housing 33, said stems being pivotally connected at their lower ends with levers 41 and 42, which are in turn pivotally secured to the frame of the engine. Coiled springs 44 are shown disposed on the valve-stems between suitable collars thereon and the under side of the housing 33 and serve to hold the valves yieldingly against the port-valve seats. For the purpose of operating these valves at predetermined periods to permit the cylinders and combustion-chambers to be freed of the spent gases resulting from the explosions counter-shafts 45 and 46 are mounted in bearings on the frame of the engine and carry gear-wheels 47 and 48, meshing with a pinion 49, secured to the driving crank-shaft 15, the ratio of which pinion and gears in the present instance being shown as two to one. Mounted on each of these counter-shafts 45 and 46 are suitable cams 50, operative on the rotation of the counter-shafts from the driving-shaft 15 to engage the levers 41 and 42 of the valve-stem 39 and 40 at predetermined periods to alternately raise and thereby open said valves to permit the exhaust, said cams being shown so disposed relatively to the counter-shafts as to permit this alternate operation of the exhaust-valves, and in the present cycle they are shown as operative in immediate succession.

At the proper predetermined period it is necessary to ignite the combustible material in the combustion-chambers 3 and 4, thereby to permit the expansive force thereof to reciprocate the pistons. Any suitable means operative to accomplish this purpose may be used, but in the present instance this is accomplished by electricity. In the organization shown this igniting means is in duplicate, one connected with each combustion-chamber, and therefore a description of one will be deemed sufficient.

Projecting through one of the walls of a combustion-chamber—for instance, chamber 3—is a pair of sparking devices comprising rods 80 and 82, having sparking-points 78 and 79. The rod 80 extends through a tube 81, of insulating material, while the rod 82 is in electrical contact with the chamber-wall. This rod 82 is mounted to rotate and is provided at its outer end with a handle or finger-piece 83, whereby the sparking-points 78 and 79 may be shifted away from each other, so that any sediment, such as oil, may be discharged should there be any collection thereof between the sparking-points and whereby also by shifting the points in one combustion-chamber out of engagement with each other the engine may be arranged for single action, as at times may be necessary, particularly in marine engines, whereby one combustion-chamber will operate the two pistons simultaneously in the manner herein set forth by an equal pressure on each of said pistons. Any desired source of electricity may be employed for producing a spark between the sparking-points 78 and 79. In the present instance I have shown a battery 84, one pole of which has a wire connection 85 with the wall of the combustion-chamber 3, and consequently with the sparking-point 79. A simple form of means is herein shown for making and breaking the electric circuit, and which in the present instance is operated by a rotary part of the engine, and comprises a gear-wheel 87, of insulating material, mounted on the counter-shaft 45. This insulated gear-wheel has a toothed metal block 88 in its periphery engaging at its inner end with a metal ring 89, secured to the gear 87, and is in mesh with a pinion 90, mounted to rotate on a fixed bracket 91, carried by the frame of the engine and insulated therefrom by suitable insulating material 92. A brush 93 is attached to the frame of the machine and bears with its free end upon the metal ring 89. From the bracket 91 a wire 85' extends to a binding-post on the outer end of the rod 80, and a wire 86 from the battery is in connection with the brush 93, whereby on the rotation of the counter-shaft 45 by the driving-shaft the insulated gear 87 is rotated to bring its metal block 88 into contact with the pinion 90, whereby an electric circuit is made and a spark produced to ignite the combustible material in the combustion-chamber 3. In the present instance since each counter-shaft 45 and 46 carries an insulated gear 87, having a metal block 88, it follows that these blocks are disposed at different points relatively to their gears, so that the ignition of the combustible material in the combustion-chambers 3 and 4 will take place at different times and herein shown in alternation and in immediate succession.

The operation of an engine constructed substantially as herein shown and described is as follows: Assuming (see Fig. 3) that fresh uncompressed gas has been drawn into the combustion-chamber 4 through the inlet-valve 30 and into the lower part of cylinder 1 and upper part of cylinder 2 and that combustion-chamber 3 is clear and that piston 16 will shortly be in position to start upward and piston 9 downward, when said piston 9 makes its downward stroke and piston 16 its upward stroke (see Fig. 10) fresh uncompressed gas

BEST AVAILABLE COPY is drawn into combustion-chamber 3 and into the upper part of cylinder 1 and lower part of cylinder 2 through the inlet-valve 29, owing to the suction created by the downward movement of said piston 9 and the upward movement of said piston 16 through the passages 5 and 6, while at the same time the fresh gas previously drawn into combustion-chamber 4 and the cylinders 1 and 2 is compressed by this downward movement of piston 9 and upward movement of piston 16 by means of passages 7 and 8, at which time the gear 87, carried by the counter-shaft 46, has been rotated by said counter-shaft into position to carry its metal block 88 into contact with the pinion 90, whereupon an electric circuit is formed, a spark produced, and the gas exploded in said chamber 4, the resulting expansive gases passing from said chamber 4 through the passages 7 and 8 to the upper side of piston 16 and the under side of piston 9, thereby simultaneously reciprocating said pistons into the position shown in Fig. 11, which upward movement of piston 9 and downward movement of piston 16 thereupon compress the fresh gas previously drawn into combustion-chamber 3, at which time the other gear 87 of the counter-shaft 45 has carried its metal block 88 into position to form contact with its pinion 90, whereupon a spark is produced in said combustion-chamber 3 and a second explosion takes place, the resultant expansive gases passing from said chamber 3 through the passages 5 and 6 to the top of piston 9 and the under side of piston 16, thereby reciprocating said pistons simultaneously into the position shown in Fig. 12, which downward movement of piston 9 and upward movement of piston 16 force out through the passages 7 and 8 and exhaust-valve 38 the spent gases resulting from the first explosion in chamber 4, said valve 38 being opened at this time by means of the cam 50, carried by the counter-shaft 46, which at this time has been rotated into position to lift the lever 42, and thereby the valve 38.

The pistons, owing to the momentum of the fly-wheel 15', continue to reciprocate, whereby piston 9 moves upward and piston 16 downward (see Fig. 13) and forces out from chamber 3 through the passages 5 and 6 and exhaust-valve 37 the spent gases resulting from the second explosion, said exhaust-valve 37 being opened at this time by the other cam 50, carried by the counter-shaft 45, and which has been rotated into position for this purpose. This movement of the pistons, owing to the suction created through passages 7 and 8, also opens the inlet-valve 30 and draws fresh combustible material into chamber 4 and lower part of cylinder 1 and upper part of cylinder 2. The pistons continue to reciprocate owing to the momentum of the fly-wheel, whereupon piston 9 goes down and piston 16 up, (see Fig. 14,) whereupon the fresh gas just drawn into chamber 4 is compressed in said chamber, and owing to the suction created through the passages 5 and 6, leading to the chamber 3, the inlet-valve 29 of chamber 3 is opened and fresh combustible material drawn into said chamber 3. At this time the insulated gear 87, carried by the counter-shaft 46, has carried its metal block 88 into position to form contact with the pinion 90, whereby a spark is produced and an explosion takes place in said chamber 4, as before. The expansive gases passing through the passages 7 and 8 to the under side of piston 9 and the upper side of piston 16 force said piston 9 upward and piston 16 downward, (see Fig. 15,) which action compresses the previously-drawn-in combustible material in chamber 3, whereupon it is exploded in the manner hereinbefore set forth.

From the foregoing it will be seen that when an explosion occurs in one combustion-chamber both pistons are simultaneously acted upon and reciprocated in opposite directions, and that, furthermore, in the present cycle an explosion in one chamber immediately follows an explosion in the other chamber, after which and before the next explosions take place both chambers 3 and 4 are cleared of spent gases and filled with fresh gas, and the gas in one of said chambers is compressed in readiness for an explosion, which explosion-stroke compresses the gas in the other chamber, all of which will be more clearly seen by reference to Fig. 16, in which for the purpose of clearly illustrating the operation of the pistons the chamber 3 is indicated at the top of the diagram, while chamber 4 is at the bottom, the heavy lines indicating the strokes of one of the pistons—as, for instance, piston 9 of cylinder 1—and which strokes correspond with those shown in Figs. 3 and 10 to 15, while the dotted lines at the commencement and end of the diagram indicate, respectively, previous and continued strokes of said piston. From this diagram it will be seen that presuming the pistons to be in the position shown in Fig. 3 and point *z* of the diagram their movement to the position shown in Fig. 10, point *a* of the diagram, draws fresh gas into chamber 3 and compresses the previously-drawn-in fresh gas in chamber 4, whereupon an explosion takes place in chamber 4, which causes the pistons to move into the position shown in Fig. 11, point *b* of the diagram, whereupon the fresh gas just drawn into chamber 3 is compressed and another explosion takes place, causing the pistons to move into the position shown in Fig. 12, point *c* of the diagram, thereby forcing out the spent gas in chamber 4, whereupon under the momentum of the fly-wheel the pistons move into the position shown in Fig. 13, point *d* of the diagram, and force out spent gas in chamber 3 and draw in fresh gas in chamber 4, and continuing their reciprocatory movement to the position shown in Fig. 14, point *e* of the diagram, draw fresh gas into chamber 3 and compress the fresh gas in chamber 4, whereupon an explosion takes place and the pis-

BEST AVAILABLE COPY tons are moved into the positions shown in Fig. 15, point *f* of the diagram, whereby the fresh gas in chamber 3 is compressed and an explosion takes place, and so on.

From the foregoing it will be seen that when an explosion occurs—for instance, in chamber 4—since there is fresh uncompressed gas in chamber 3 this gas while being compressed acts as a cushion to counteract the shock caused by an explosion of the material in chamber 4, and when an explosion occurs—for instance, in chamber 3—since there is spent gas in chamber 4 this acts to a certain extent while being forced out as a cushion to counteract the shock caused by an explosion of material in chamber 3.

In conclusion, it will be seen that since the pressure on one side of one piston is equal to that on the other side of the other piston it follows that a perfectly-balanced engine is provided, thus avoiding or reducing the ordinary shocks which take place in gas-engines as usually constructed to a minimum and making it practicable to construct an engine of comparatively light weight and bulk, but having power equal to engines of greater bulk and weight; that, furthermore, this perfect balance will greatly reduce the friction, thereby reducing the amount of fuel necessary, and since the inlet-valves open directly into the explosion-chambers there will be no loss of heat, as in engines commonly constructed with relatively long ports or passages, and as the ports leading from the combustion-chambers to the piston-cylinders may be of relatively large area the ignited gas will not be subjected to cooling.

I claim as my invention—

1. An engine of the class specified comprising a pair of cylinders; a piston in each of said cylinders; a pair of combustion-chambers, each combustion-chamber communicating with both of said cylinders in such manner that the pressure of exploded material may be exerted at one side of one piston and at the opposite side of the other piston, and so that, also, the pistons may be acted on, first at one side, and then at the opposite side thereof.

2. A combustion-engine comprising a pair of cylinders; a piston in each of said cylinders; a pair of combustion-chambers intermediate said cylinders, each of said combustion-chambers having communication with one end of one cylinder and with the opposite end of the other cylinder, in such manner that the pressure of exploded material may be exerted at one side of one piston and at the opposite side of the other piston, and so that, also, the pistons may be acted on, first on one side, and then at the opposite side thereof.

3. A combustion-engine comprising a pair of cylinders; a piston in each of said cylinders; a pair of combustion-chambers, each combustion-chamber communicating with both of said cylinders, so that the pressure of exploded material will be exerted at one side of one piston and at the opposite side of the other piston; and automatic means for alternately igniting explosive material in said combustion-chambers.

4. A combustion-engine comprising a pair of cylinders; a piston in each of said cylinders; a pair of combustion-chambers, each combustion-chamber communicating with both of said cylinders to permit the pressure of exploded material to be exerted at one side of one piston and at the opposite side of the other piston; and means for alternately controlling the admission of combustible material to said combustion-chambers.

5. A combustion-engine comprising a pair of cylinders; a piston in each of said cylinders; a pair of combustion-chambers, each combustion-chamber communicating with both of said cylinders to permit the pressure of exploded material to be exerted at one side of one piston and at the opposite side of the other piston; and means for alternately controlling the exhaust of spent combustible material from said chambers.

6. A combustion-engine comprising a pair of cylinders; a piston in each of said cylinders; a pair of combustion-chambers, each combustion-chamber communicating with one end of one cylinder and with the opposite end of the other cylinder, so that the pressure of exploded material may be exerted at one side of one piston and at the opposite side of the other piston, and so that, also, the pistons may be acted on, first at one side, and then at the opposite sides thereof; means for controlling the admission of combustible material to said combustion-chambers; and means for controlling the exhaust therefrom.

7. An engine of the class specified comprising a pair of cylinders; pistons operating in said cylinders; a pair of combustion-chambers, each having port communications with both of said cylinders, so that the pressure of exploded material will be exerted at one side of one piston and at the opposite side of the other piston; means for controlling the admission of combustible material to said combustion-chambers; independent means for igniting said combustible material in each combustion-chamber; and means for controlling the exhaust from said combustion-chambers.

8. A combustion-engine comprising a pair of cylinders; pistons operating in said cylinders; a pair of combustion-chambers, each having port communications with both of said cylinders, so that the pressure of exploded material will be exerted at one side of one piston and at the opposite side of the other piston; means for igniting combustible material in the combustion-chambers; inlet-valves operative by one part of the engine; and exhaust-valves operative by another part thereof.

9. A combustion-engine comprising a pair of cylinders; a piston in each of said cylin-

BEST AVAILABLE COPY ders; a pair of combustion-chambers, each of said combustion-chambers communicating with both of said cylinders, so that the pressure of exploded material will be simultaneously exerted at one side of one piston and at the opposite side of the other piston; means for alternately admitting combustible material to said chambers; means for alternately igniting said material in said chambers; and means for alternately permitting an exhaust thereof.

10. A combustion-engine comprising a pair of cylinders; pistons operating in said cylinders; a pair of combustion-chambers, each having port communications with both of said cylinders at opposite ends thereof, so that the pressure of exploded material will be exerted at one side of one piston and at the opposite side of the other piston; means for igniting combustible material in the combustion-chambers and thrown into and out of operation by a part of said engine; inlet-valves operated by a part of the engine; and exhaust-valves also operated by a part of said engine.

11. A combustion-engine comprising a pair of piston-cylinders; pistons therein; a pair of combustion-chambers, each having port communications with both of said cylinders; thereby to permit the pistons to be acted on, first at one side, and then at the opposite side thereof; a carbureter having communication with the combustion-chamber; and means for controlling said communications.

12. A combustion-engine comprising a pair of cylinders; pistons in said cylinders; a pair of combustion-chambers, each in communication with both of said cylinders; a carbureter having communication with the combustion-chambers; valves for controlling said communications, means for igniting combustible material in said combustion-chambers; and valves for controlling exhaust from said chambers.

13. An engine of the class specified comprising a plurality of cylinders; a piston in each of said cylinders; and a plurality of combustion-chambers, each combustion-chamber having communication with all of said cylinders, so that the pressure of exploded material may be simultaneously exerted at one side of one piston and at the opposite side of another piston, and so that, also, said pistons may be acted on, first at one side, and then at the opposite side thereof.

14. A combustion-engine comprising a piston-cylinder; a piston therein; and a pair of combustion-chambers, one combustion-chamber having communication with said piston-cylinder adjacent to one end thereof, and the other combustion-chamber having communication with said piston-cylinder adjacent to the opposite end thereof.

15. A combustion-engine comprising a piston-cylinder; a piston therein; and a pair of combustion-chambers, one combustion-chamber having communication with said piston-cylinder adjacent to one end thereof, and the other combustion-chamber having communication with said piston-cylinder adjacent to the opposite end thereof; means for controlling the admission of combustible material to said chambers; means for igniting the combustible material; and means for controlling the exhaust from said chambers.

16. A combustion-engine comprising a pair of piston-cylinders disposed side by side; and a combustion-chamber intermediate said cylinders and having communication with both of said cylinders; means for igniting the combustible material in said chamber; and means for controlling the admission of combustible material to said chamber and the exhaust of spent material therefrom.

17. A combustion-engine comprising a pair of cylinders disposed side by side; a combustion-chamber having communication adjacent to one end with one cylinder and adjacent to its opposite end with the other cylinder; means for controlling the admission of combustible material to said chamber; means for igniting said material; and means for controlling the exhaust of spent material from said chamber.

18. A combustion-engine, embodying a plurality of combustion-chambers; and mechanism, substantially as described operative at one predetermined period to draw fresh combustible material into one chamber and simultaneously to compress previously-drawn-in fresh combustible material in another chamber, thereby to permit an explosion thereof; then operative at another period to compress the fresh combustible material drawn into said first chamber, thereby to permit an explosion thereof; then operative at another period to exhaust spent combustible material from said second chamber; and then operative at another period to exhaust spent combustible material from said first chamber preparatory to drawing fresh combustible material therein, and simultaneously to draw fresh combustible material into said second chamber preparatory to compressing the same to permit an explosion thereof, substantially as set forth.

19. A combustion-engine, embodying a pair of combustion-chambers and a pair of pistons, organized substantially as described to have explosions in said chambers in immediate succession, and to have intermediate said successive explosions spent combustible material successively forced out of said chambers and fresh combustible material successively drawn into said cleared chambers and compressed in one of said chambers, substantially as set forth.

20. A combustion-engine comprising a pair of cylinders; a crank-shaft; pistons operative in said cylinders and operatively connected with said crank-shaft; a pair of combustion-chambers, each in communication with both of said cylinders, so that the pressure of exploded combustible material will be exerted

BEST AVAILABLE COPY on the top of one piston and on the bottom of the other piston; means for controlling the admission of combustible material to said chambers; means for controlling the exhaust therefrom and comprising a pair of alternately-operative valves; means operative from said crank-shaft and embodying cams for operating said valves at predetermined periods.

21. A combustion-engine comprising a pair of cylinders; pistons operative in said cylinders; a pair of combustion-chambers, each combustion-chamber having communication with both of said cylinders, so that the pressure of exploded gas in each cylinder will be simultaneously exerted on the top of one piston and on the bottom of the other piston, and so that the pistons will be acted on, first at one side, and then at the opposite side thereof; a carbureter having communication with the combustion-chambers; valves operative by the suction of the pistons for controlling said communication; means for manually regulating the entrance of air to said carbureter; and means for automatically regulating the admission of air to said carbureter.

22. A combustion-engine comprising a pair of cylinders; a piston operative in each of said cylinders; a pair of combustion-chambers, each in communication with both of said cylinders, so that the pressure of exploded gas will be exerted on the top of one piston and on the bottom of the other piston, and so that, also, the pistons will be acted on, first at one side, and then at the opposite side thereof; a carbureter having communication with said combustion-chambers; means for supplying atmospheric air thereto; means for supplying heated air to the carbureter; and means for supplying oil to said carbureter.

23. A combustion-engine comprising a pair of cylinders; a piston operative in each of said cylinders; a pair of combustion-chambers, each in communication with both of said cylinders, in such manner that the pressure of exploded gas will be exerted on the top of one piston and on the bottom of the other piston, and so that the piston will be acted on, first at one side, and then at the opposite side thereof; a carbureter having communication with said combustion-chambers; means for supplying atmospheric air thereto; means for supplying heated air to the carbureter; means for supplying oil to said carbureter; and means for controlling the passage of the combined fluid to said combustion-chambers.

24. A combustion-engine comprising a pair of cylinders; a piston in each of said cylinders; a pair of combustion-chambers, each combustion-chamber having communication with both of said cylinders, whereby the pressure of exploded gas therein will operate simultaneously at the top of one cylinder and at the bottom of the other cylinder; a source of electricity; sparking-points projecting into a combustion-chamber and having connection with said source of electricity, one of said sparking-points being mounted for shiftable movement, whereby it may be shifted out of its operative position; and means operative by the engine for making and breaking the electric circuit.

25. A combustion-engine comprising a pair of cylinders; a pair of combustion-chambers, each combustion-chamber having communication with both of said cylinders; so that the pressure of exploded material will be exerted adjacent to one end of one cylinder and adjacent to the opposite end of the other cylinder simultaneously, and so that the pistons may be acted on, first at one side, and then at the opposite side thereof; and means for supplying combustible material to said combustion-chambers.

26. A combustion-engine comprising a pair of cylinders; a piston in each of said cylinders; a combustion-compartment having a partition forming a pair of independent combustion-chambers, each of said chambers having port communications with both of said cylinders; and means for alternately admitting combustible material to said chambers.

27. A combustion-engine comprising a pair of cylinders, a piston in each of said cylinders; a combustion-compartment having a partition forming a pair of independent combustion-chambers, each of said chambers having port communications with both of said cylinders; means for alternately admitting combustible material to said chambers; and means for alternately permitting an exhaust of said chambers.

28. A combustion-engine comprising a pair of cylinders; a piston in each of said cylinders; a combustion-compartment having a partition forming a pair of independent combustion-chambers, each of said chambers having port communications with both of said cylinders; and means for alternately igniting combustible material in said chambers.

29. A combustion-engine comprising a casing having two cylinders; pistons operating in the said cylinders; combustion-chambers in the casing having port communications at the top and bottom with the cylinders, so that the pressure of exploded gas will be exerted on the top of one piston and on the bottom of the other piston; means for igniting the gas in the combustion-chambers; valves for controlling the admission of gas; and valves for controlling the exhaust, substantially as specified.

30. A combustion-engine comprising a casing having two cylinders; pistons operating in the cylinders; combustion-chambers in the casing having port communications at the top and bottom with the cylinders, so that the pressure of the exploded gas will be exerted on the top of one piston and on the bottom of the other; means for igniting the gas in the combustion-chambers; gas-admission valves

BEST AVAILABLE COP operated by the suction of the pistons; and exhaust-valves operated by a rotary part of the engine, substantially as specified.

31. A combustion-engine comprising a casing having two cylinders; pistons operative in said cylinders; combustion-chambers in the casing, each in communication with both of said cylinders to permit pressure to be exerted at one side of one piston and at the opposite side of the other piston; means for igniting gas in the combustion-chambers; a carbureter having communication with the combustion-chambers; valves for controlling said communication; valves for controlling the exhaust from the chambers; and means for automatically controlling the admission of air to the carbureter, substantially as specified.

32. A combustion-engine comprising a casing having two cylinders and two combustion-chambers; pistons operating in the cylinders; a carbureter having communication with the combustion-chambers; automatically-regulated valves for controlling said communications; automatically-operated valves for controlling the exhaust; an auxiliary chamber in the carbureter, the upper end of the wall of which forms a valve-seat; a valve for said seat; an oil-inlet; a valve for said oil-inlet having connection with the valve of the auxiliary chamber; and means for controlling and regulating the admission of air to the carbureter through the auxiliary chamber, substantially as specified.

33. A combustion-engine comprising a casing having two cylinders and two combustion-chambers; pistons operating in the cylinders; a carbureter having communication with the combustion-chambers; valves for controlling said communications; an exhaust-pipe; a jacket surrounding said exhaust-pipe and having perforations; a pipe connection between said jacket and the carbureter; an oil-supply having connection with the carbureter; a valve for controlling the admission of oil; a valve for controlling the admission of atmospheric air and operating coincidently with the oil-controlling valve; and means for regulating the admission of air, substantially as as specified.

34. A combustion-engine comprising a casing having two cylinders and two combustion-chambers; means for igniting gas in the combustion-chambers; pistons operating in the cylinders; a housing on the casing having port communications with the combustion-chambers; valves for controlling said communications and operated by the suction of the pistons; a carbureter having communication with the housing; an exhaust-pipe; valves for controlling the exhaust; a jacket surrounding the exhaust-pipe and having a series of perforations; a pipe connection between said jacket and the carbureter; an auxiliary chamber in the carbureter, the upper end of the wall of said auxiliary chamber forming a valve-seat; a puppet-valve for engaging the said seat; an oil-inlet; a valve for controlling said oil-inlet and having connection with the puppet-valve; an inlet-pipe for the auxiliary chamber; a valve in said inlet-pipe; a governor operated by the engine; and a connection between said governor and the valve in the inlet-pipe, substantially as specified.

35. A combustion-engine comprising a casing having two cylinders and two combustion-chambers; pistons operating in said cylinders; a carbureter having communication with the combustion-chambers; valves for controlling said communications; an air-inlet for the carbureter; two perforated disks in said inlet, one of said disks being adapted to be turned manually; and means for automatically turning the other disk, substantially as specified.

36. A combustion-engine comprising a casing having cylinders and combustion-chambers; pistons operating in the cylinders; a carbureter having communication with the combustion-chambers; valves for controlling said communications; an exhaust-pipe; valves for controlling the exhaust; a jacket surrounding the exhaust-pipe, the said jacket having perforations through its wall and also having communication with the carbureter; an air-inlet pipe for the carbureter; disks mounted to rotate in said inlet and having openings, the said openings having a greater area than the combined area of the perforations in the jacket; and means for operating said disks, substantially as specified.

AUGUSTUS G. PACE.

Witnesses:
C. S. WEED,
CHAS. FINKLER.